United States Patent [19]

Hill et al.

[11] Patent Number: 5,241,409
[45] Date of Patent: Aug. 31, 1993

[54] COMMUNICATIONS NETWORK WITH SWITCHING DISTRIBUTED AMONG A CENTRAL SWITCHING NODE AND OPTICAL INPUT AND OUTPUT SUB-NETWORKS

[75] Inventors: Alan M. Hill; David B. Payne, both of Woodbridge, England

[73] Assignee: British Telecommunications public limited company, London, England

[21] Appl. No.: 721,559

[22] PCT Filed: Feb. 5, 1990

[86] PCT No.: PCT/GB90/00170

§ 371 Date: Aug. 5, 1991

§ 102(e) Date: Aug. 5, 1991

[87] PCT Pub. No.: WO90/09725

PCT Pub. Date: Aug. 23, 1990

[30] Foreign Application Priority Data

Feb. 8, 1989 [GB] United Kingdom ............... 8902746

[51] Int. Cl.⁵ ........................................... H04J 14/02
[52] U.S. Cl. .................................... 359/128; 359/117; 359/139
[58] Field of Search ............... 359/117, 109, 121, 124, 359/128, 133, 139, 118, 164; 370/58.1; 385/16, 17, 24

[56] References Cited

U.S. PATENT DOCUMENTS

| | | | |
|---|---|---|---|
| 4,763,317 | 8/1988 | Lehman et al. | 370/58.1 |
| 4,834,483 | 5/1989 | Arthurs et al. | 359/121 |
| 4,873,681 | 10/1989 | Arthurs et al. | 359/121 |
| 5,091,905 | 2/1992 | Amada | 370/63 |

FOREIGN PATENT DOCUMENTS

WOA86/056-
49 9/1986 PCT Int'l Appl. .
2043240 10/1980 United Kingdom .

OTHER PUBLICATIONS

Patent abstract of Japan, vol. 7, No. 284 (E–217)(1429), Dec. 17, 1983 and JP,A,58161486 (Nippon Denki K.K.) Sep. 1983.

Patent abstract of Japan, vol. 4, No. 44 (E–5)(526), p164 E 5 and JP, A5516584 (Nippon Denshin Denwa Kosha) Feb. 5, 1980.

*Primary Examiner*—Edward L. Coles, Sr.
*Assistant Examiner*—Kinfe-Michael Negash
*Attorney, Agent, or Firm*—Nixon & Vanderhye

[57] ABSTRACT

A communications network in which a central switching node (70) has at least two sets of both input ports (52) and output ports (56) coupled to respective sets of transmitters ($T_{ij}$) and receivers ($R_{ij}$) by passive optical networks (54) and (58) and demultiplexers (52) and multiplexers (59). The transmitters ($T_{ij}$) are tunable so that each can be selectively the input ports (52). The receivers ($R_{ij}$) are also tunable so the output ports (56) can be selectively coupled to the one or more of the receivers ($R_{ij}$). Alternatively, the demultiplexers (55) and multiplexers (59) can be tunable. This devolves some of the switching function outside the central switching node (50) thereby reducing the component count.

14 Claims, 6 Drawing Sheets

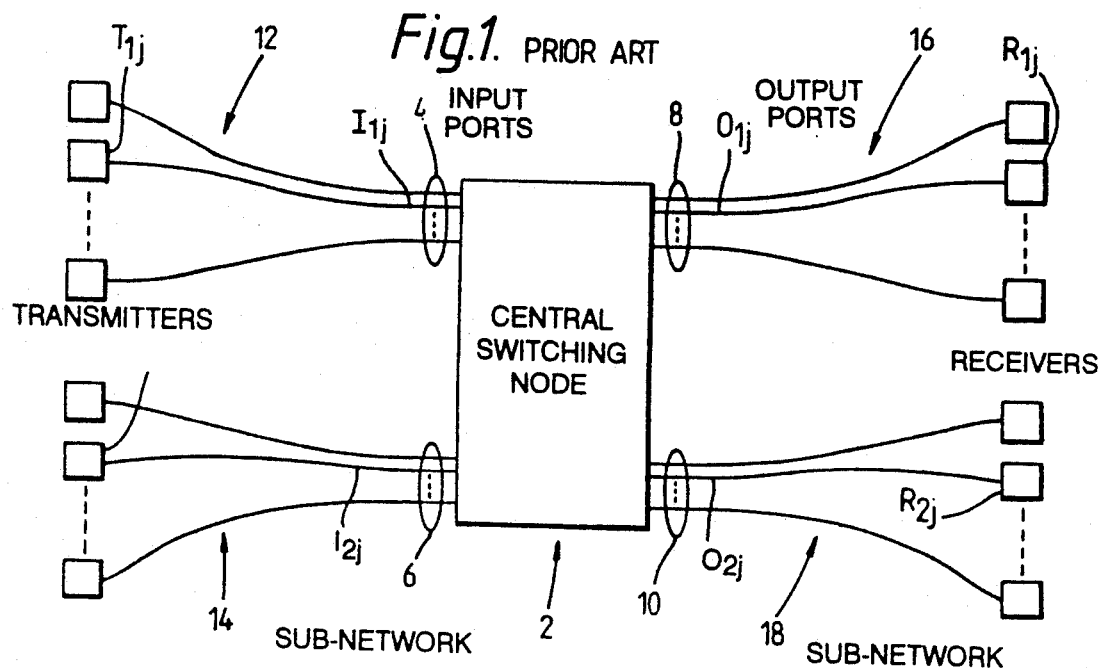
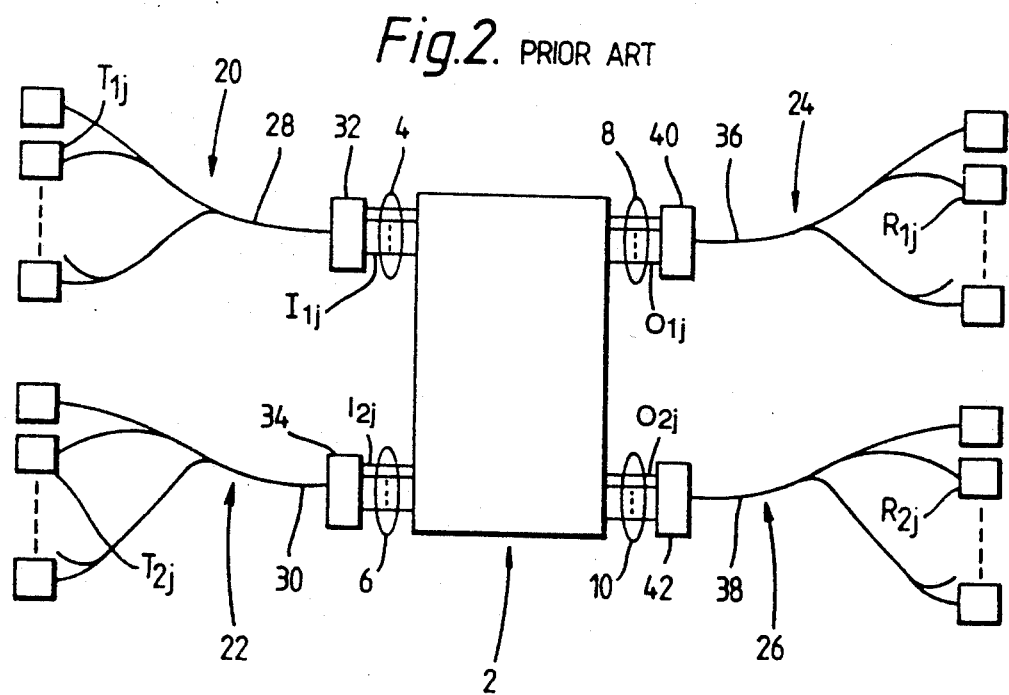

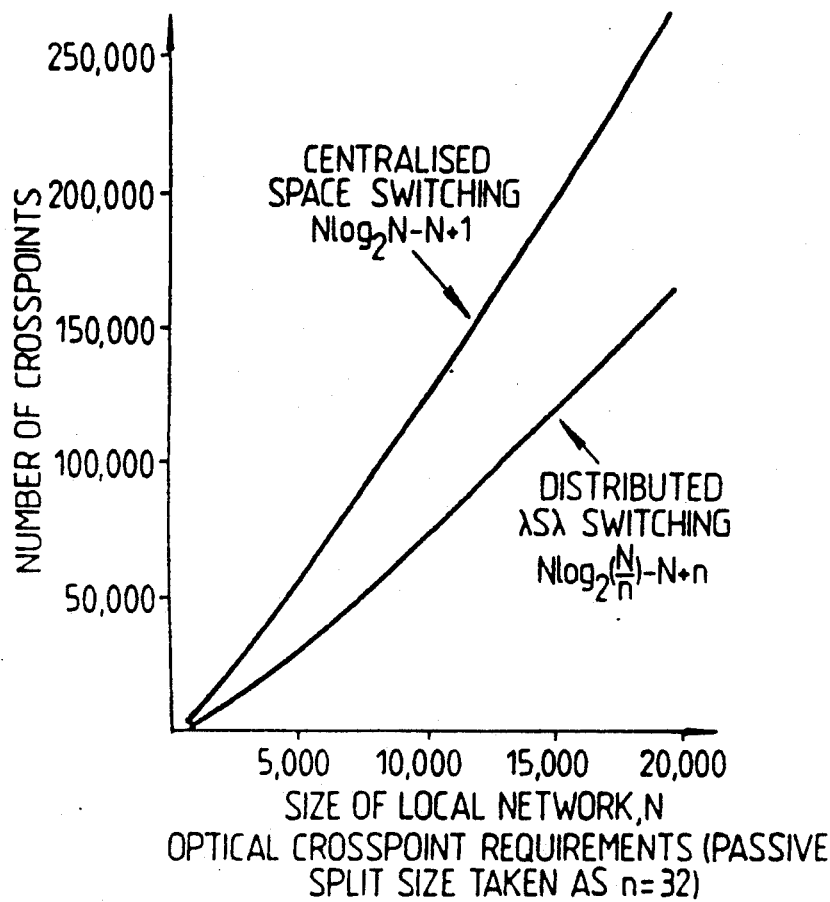
Fig.4. OPTICAL CROSSPOINT REQUIREMENTS (PASSIVE SPLIT SIZE TAKEN AS n=32)
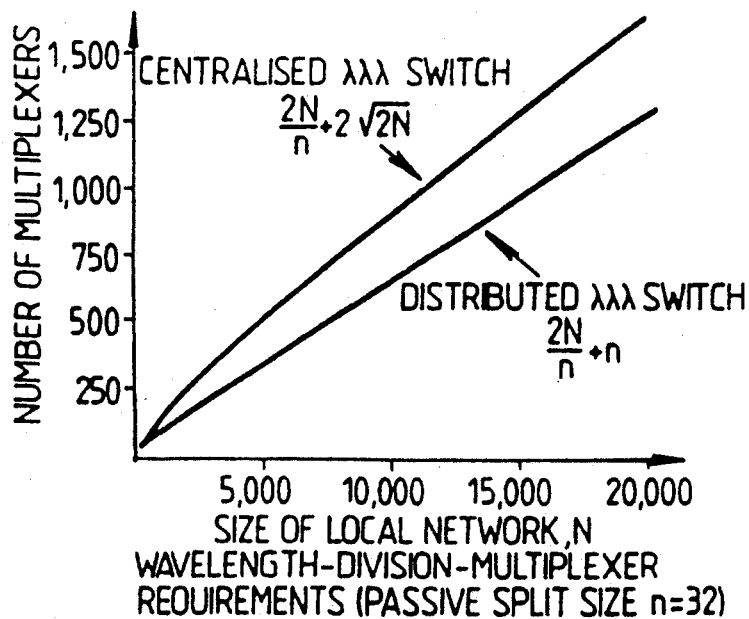
Fig.6. WAVELENGTH-DIVISION-MULTIPLEXER REQUIREMENTS (PASSIVE SPLIT SIZE n=32)

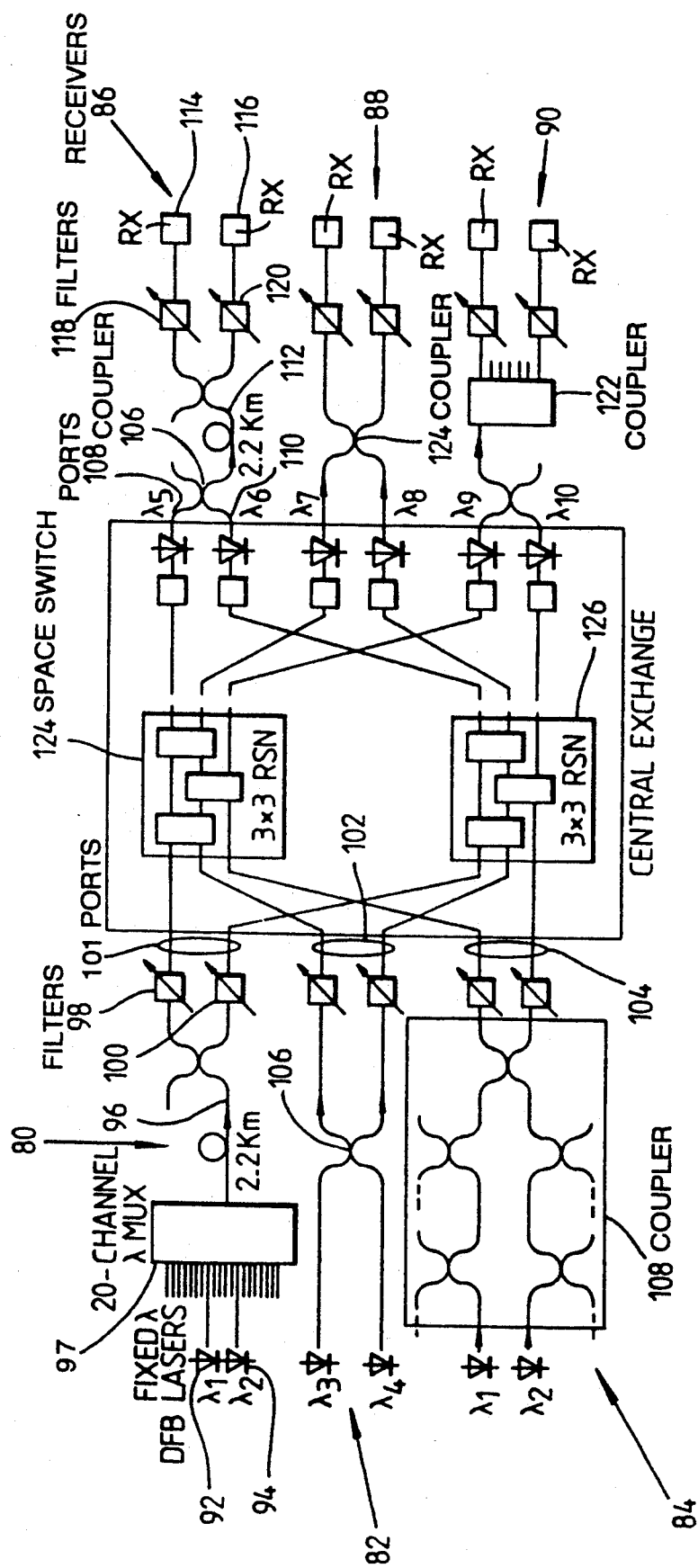

SELECTION OF TWO ADJACENT CHANNELS FROM A 20-CHANNEL SINGLEMODE WAVELENGTH-DIVISION-MULTIPLEXER, WITH 3.6 nm CHANNEL SPACING, 12 CHANNELS ARE OCCUPIED BY DFB LASER SOURCES, AND CHANNEL SELECTION IS BY TUNEABLE GRATING FILTER.

COMMUNICATIONS NETWORK WITH SWITCHING DISTRIBUTED AMONG A CENTRAL SWITCHING NODE AND OPTICAL INPUT AND OUTPUT SUB-NETWORKS

FIELD OF THE INVENTION

This invention relates to communications networks, and in particular to networks in which the transmitters of two or more sub-networks of transmitters are connectable to receivers of two or more sub-networks of receivers by means of a central switching node.

BACKGROUND OF THE INVENTION

In a known implementation of such a network, the transmitters and receivers are linked to the input and output ports of the central switching node by means of dedicated electrical communications links, the node having sufficient switching power to be able to interconnect a desired number of ports.

Passive optical networks are emerging as a promising means of providing customers with broadband services, and are economically attractive for providing telephony and low data-rate services to customers requiring just a few lines. The telephony passive optical network (TPON) shares customer access costs by means of a passive splitting architecture to multiplex up to 128 customers, with current technologies, onto a single fibre at the exchange. With such a network in place, broadband services could easily be provided by the addition of more operating wavelengths. The first step towards a broadband passive optical network (EPON) would probably be to add just a few wavelengths, each allocated to a particular service such as broadcast TV, video library and ATN services, with each wavelength electronically multiplexed to provide sufficient numbers of channels. In the longer term, spectrally-controlled sources such as DFB lasers would allow extensive wavelength multiplexing, and the possibility of allocating wavelengths to individual customers or connections, to provide wavelength switching across the network.

It has therefore been proposed to link the sub-networks of transmitters and receivers to the central switching node by means of such passive optical networks, each transmitter of a sub-network transmitting information optically on an optical carrier of a fixed, distinct wavelength, and the various transmitted signals being passively multiplexed onto a single optical fibre for transmission to the central switching node. A demultiplexer at the central switching node would separate the signals according to wavelength, and convert each into an electrical signal. In this way, each transmitter is permanently linked to a distinct, input port of the central switching node. Similarly, the outgoing connections from the output ports of the central switching node to the optical receivers can be in the form of a passive optical network. The outgoing signal from each output port of the central switching node is converted to an optical signal of a wavelength corresponding to that which the receiver associated with that output port is configured to receive. These optical signals for the receivers of the sub-network are multiplexed onto a single outgoing optical fibre, which multiplex is passively split to each receiver. Each receiver selects the wavelength corresponding to it by the use, for example, of an optical filter or a coherent optical receiver. Such a network, employing passive optical sub-networks, requires a central node of the same switching power as that using dedicated electrical connections for the same interconnect power.

Another known interconnection arrangement uses wavelength switching or routing which is a simple but powerful technique for providing both one-to-one and broadcast connections between customers. One-to-one connections simply require each customer to have a tunable light source connected by a wavelength division multiplexer. Light can be directed from any transmitter to any receiver by tuning to an appropriate wavelength. A fast connection time of 2 nsec, has been demonstrated using a cleaved coupled cavity laser. Broadcast or distributed connections are naturally provided by a star coupler arrangement shown, for example, in patent specification EP-A-2,043,240. A star coupler splits the optical power from each input port to every output port so that, by using sources of fixed, distinct wavelengths, appropriate channels can be selected at the receivers by means of tunable optical filters. This has been demonstrated using an $8 \times 8$ array of wavelength-flattened fusedfibre couplers and position-tunable holographic filters recorded in dichromated gelatin, to tune across the entire long-wavelength window from 1250–1600 nm. An acousto-optic tunable filter has more recently been demonstrated with about 1 nm bandwidth, 260 nm tuning range, and a channel selection speed of 3 microseconds.

In common with optical space switches, use of wavelength switching in the local network would enable the full potential of optics to be realized, by providing a broadband optical switching and distribution capability, which is essentially transparent to the chosen signal bandwidth and modulation format. A large number of diverse optical technologies have been identified for achieving both space and wavelength switching in a local network environment.

However, both switching techniques have their limitations and disadvantages. For space switches, it is the sheer number, and hence cost, of crosspoints or equivalent switches needed to interconnect customers (from information theory the minimum growth rate that can be incurred is $\log_2(N!)$). For wavelength switches, the problem is the limited number of available distinct wavelength channels, which restricts the number of customers, although this limitation can be overcome by employing wavelength switches in three or more stages of switching, which allows the same wavelengths to be re-used in different "switches". For space switches, the use of multi-stage networks can never overcome the $\log_2(N!)$ growth rate.

SUMMARY OF THE INVENTION

The present invention provides a communications network comprising a central switching node having at least two sets of input ports and at least two sets of output ports, each set of input ports being coupled to a respective set of optical transmitters by a respective input optical sub-network performing a switching function to control the coupling of each transmitter to at least any one selected input port, and each set of output ports being coupled to a respective set of optical receivers by a respective output optical sub-network performing a switching function to control the coupling of each output port to at least any one receiver.

In a preferred embodiment, at least one of the input optical subnetworks includes an input optical fibre subnetwork for passively multiplexing signals from the respective set of optical transmitters into an input multiplex of transmitter channels, and said at least one input optical sub-network further comprises an input demultiplexing means for coupling each channel of the respective multiplex to a respective input. Advantageously, each transmitter of each said at least one input optical sub-network is controllable to transmit signals on a channel corresponding to the input port to which it is to be selectively coupled.

The architecture of the network of the invention can provide significant reductions in component quantities by distributing some of the switching task away from the central switching node to the input and output optical sub-networks, rather than using the conventional approach of performing all the switching centrally in the exchange. The switching task is then separated into three stages, with the first and third stages implemented, for example, as multiplex switches operating in a distributed manner in the external sub-networks connecting the central switching node to the transmitters and receivers. Only the middle stage of the switch is located in the central node or "exchange". The middle stage can be implemented either in the form of space switches or wavelength switches.

Alternatively, the input demultiplexing means of each said at least one input optical sub-network is controllable to couple the signals on each channel to a selected input port. Preferably, at least one of the output optical sub-networks includes an output optical fibre sub-network, and said at least one output optical sub-network further comprises an output multiplexing means for passively multiplexing signals from the respective set of outputs into an output multiplex of receiver channels, the output optical fibre sub-network coupling the output multiplex to the respective receivers, and each receiver being arranged to receive signals from one channel. Advantageously, each receiver of each said at least one output optical sub-network is controllable to receive signals on a channel corresponding to the output port to which it is to be selectively coupled. Alternatively, the output multiplexing means of each said at least one output optical sub-network is controllable to form an output multiplex of signals on the associated channels such that each output port is coupled to a selected receiver.

Preferably, the multiplexes are wavelength multiplexes in which the selectivity is achieved by means of frequency selective devices, for example, on the input side, tunable lasers at the transmitters, or frequency selective filters at the input ports; and, on the output side, passive splitting to tunable filters at the receivers, or fixed filters at the receivers with tunable lasers in the multiplexing means.

Other multiplexing techniques may be employed, for example time domain multiplexes, the coupling of the transmitters and the receivers to respective input and output ports being achieved by altering the time slots to which the transmitters and the receivers are allocated, or by controlling the demultiplexers or the multiplexers at the input and output ports, the transmitters and the receivers being allocated to dedicated time slots.

The network according to the present invention reduces the switching power needed at the central switching node for a given interconnect power by devolving some of the switching function to the sub-networks. For example, in the case where wavelength multiplexing is employed by controlling the wavelength on which the optical transmitters transmit their signals to the central node, it is possible to route the signals selectively to any of the input ports of the set by controlling the wavelength of the transmissions. Similarly, by controlling the wavelength which the optical receivers receive, the optical signals from the output ports of a set of output ports can be selectively routed to any one of the corresponding sets of optical receivers. Again, if the optical transmitters and receivers transmit or receive a fixed wavelength, the demultiplexers at the input ports or the multiplexers at the output ports can be made tunable to effect the switching between the transmitters and receivers the and the input and output ports, respectively, of the central switching node.

The present invention also has the advantage of allowing concentration, that is the use of fewer multiplex channels, for example wavelengths, with a sub-network than there are optical transmitters or optical receivers by allocating the available channels dynamically to those wishing to transmit or receive at a given time.

BRIEF DESCRIPTION OF THE DRAWINGS

Embodiments of the present invention will now be described, by way of example only, with reference to the accompanying drawings in which:

FIG. 1 is a schematic diagram of a prior art communications network;

FIG. 2 is a schematic diagram of a further prior art communications network using passive optical networks to link transmitters and receivers with a central exchange;

FIG. 4 is a graph comparing the optical crosspoint requirements for centralised space switching and wavelength/space/wavelength switching according to the present invention;

FIG. 6 is a graph comparing the optical crosspoint requirements for centralised switching and wavelength/wavelength switching according to the present invention;

FIG. 7 is a schematic diagram of an experimental embodiment of the present invention employing several optical technologies.

DETAILED DESCRIPTION OF THE DRAWINGS

Figure 3:
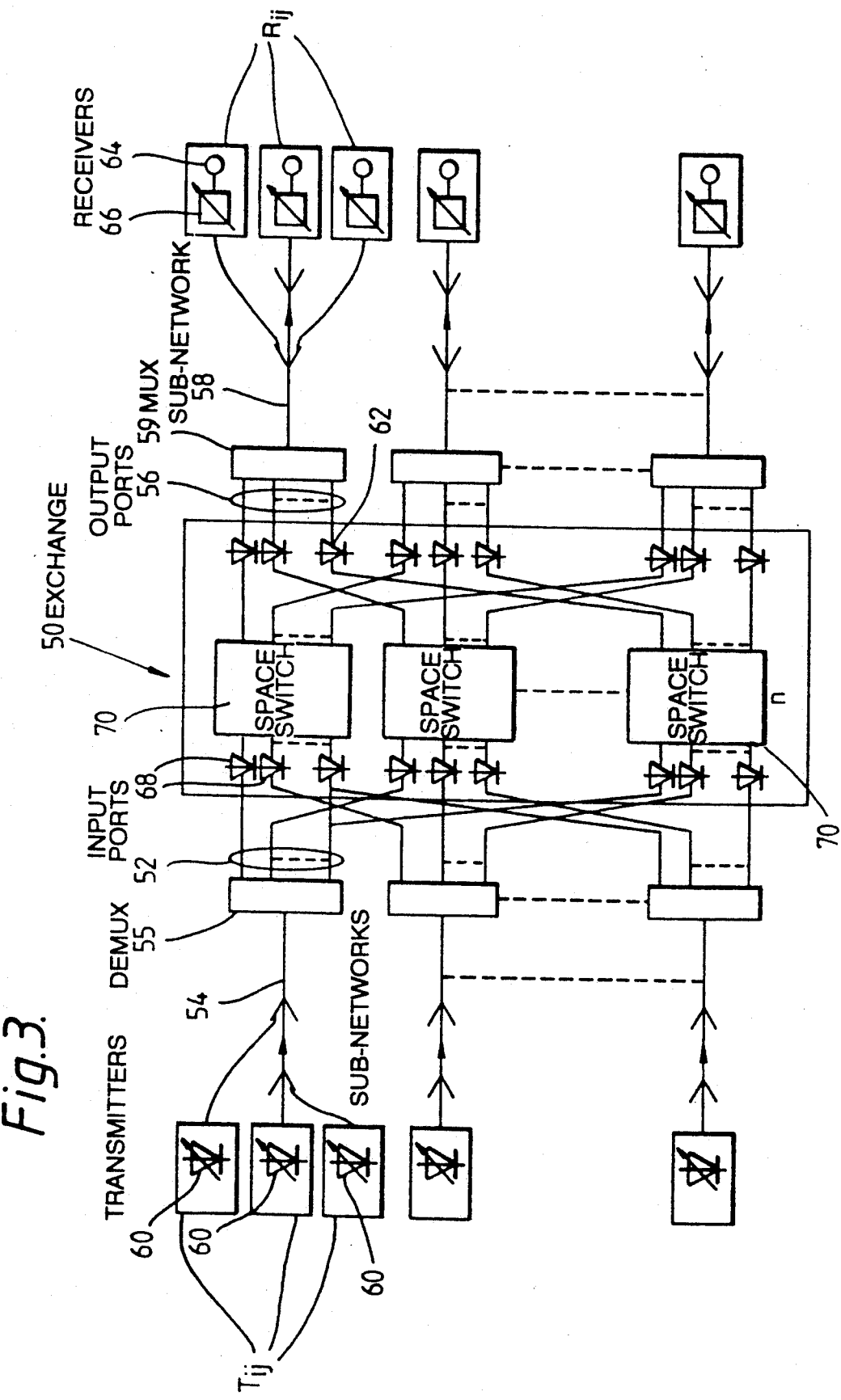
FIG. 3 is schematic diagram of a communications network according to the present invention, employing tunable transmitters and receivers and central space switching.

Referring to FIG. 1, an exemplary prior art communications network comprises a central switching node 2 having two sets of input ports 4 and 6 with input ports $I_{1j}$ and $I_{2j}$ respectively, and two sets of output ports 8 and 10 with output ports $O_{1j}$ and $O_{2j}$ respectively.

Two groups of optical transmitters $T_{1j}$ and $T_{2j}$ are directly connected to the correspondingly-subscripted input port $I_{ij}$ (i=1 or 2) by a respective input connection means formed by transmitter sub-networks 12 and 14, respectively.

Similarly, each output port $O_{ij}$ of the two sets of output ports 8 and 10 is directly coupled to a correspondingly-labelled receiver $R_{ij}$ by a respective receiver sub-network 16 and 18.

The central switching node 2 is provided with sufficient switching power to achieve the required degree of interconnectivity between the transmitters $T_{ij}$ and the receivers $R_{ij}$ the details of which are not shown.

If switching in a future optical local network were to be undertaken in the same way, i.e. to transport customer signals to a central node or exchange where all the interconnection equipment is located, shared access over the passive network could be achieved by multiplexing in any of the time, frequency or wavelength domains. To make the maximum broadband capacity available to customers, the wavelength domain is preferred.

FIG. 2 shows the physical structure of a large, optical local network, employing passive wavelength division multiplexing techniques to transport broadband channels to, and from, each customer, the network being arranged to interconnect the same number of transmitters and receivers as the communications network of FIG. 1, the identical elements being indicated by the same designations as in FIG. 1. All switching is, again, performed in the central switching node 2.

In the network of FIG. 2, each transmitter $T_{ij}$ is an optical transmitter transmitting optical signals at a particular one of various distinct wavelengths, each corresponding to a communication channel. The optical outputs from the transmitters $T_{ij}$ are passively multiplexed by sub-networks 20 and 22 onto single fibres 28 and 30 coupled to corresponding demultiplexers 32 and 34, each of which couples optical signals of a given wavelength to a corresponding one of the ports $I_{ij}$. Each transmitter $T_{ij}$ is, therefore, permanently coupled to a distinct one of the input ports $I_{ij}$.

Each receiver $R_{ij}$ is a wavelength-selective optical receiver. Each output port $O_{ij}$ of the sets of output ports 8 and 10 transmits an optical signal at a distinct wavelength, which signals are passively multiplexed onto respective single optical fibres 36 and 38 by respective multiplexers 40 and 42. The multiplexes 40 and 42 may be formed by passive optical couplers, for example. The wavelength multiplex is passively coupled to each wavelength selective receiver $R_{ij}$, each of which selects the wavelength channel to be received. Each receiver $R_{ij}$ is, therefore, permanently coupled to a distinct one of the output ports $O_{ij}$.

The FIG. 2 network shows simplex operation, with upstream and downstream directions being carried over different passive limbs. The principle can be extended to duplex, single-sided operation. Regenerators and lasers (not shown) can be used in known manner to recover the signal level either side of the central switch node 2, to accommodate losses in the switch. Alternatively, optical amplifiers could be used on the input side of the switch, but not in general on the output side, where wavelength translation may be needed. A suitable wavelength converter would make use of non-linear effects in optical amplifiers. The central exchange 2 can be implemented either as a multi-stage space switch, or as a three-stage wavelength/wavelength/wavelength switch.

There are many potential technologies and architectures for implementing optical space switches in the central exchange. But perhaps the solution requiring the least components, and ordering the lowest loss, is a multi-stage re-arrangeable network. Studies have shown that very large switches could be built with these structures, suing crosspoints of only modest crosstalk performance. Mean losses of 1 dB per crosspoint in a two-sided switch could yield sizes of 32,768×32,768 with a 29 dB power budget. The number of crosspoints required to connect N inputs to N outputs with these networks is $$Nlcg_2(N)-N+1 \tag{1}$$

which is very close to the information theory limit $log_2(N!)$.

If the central exchange 2 of FIG. 2 is to be implemented by wavelength switching techniques, there are unlikely to be sufficient wavelength channels for the switching to be achieved in a single stage. Generalising the network of FIG. 2 to have N customers in sets of n transmitters and receivers coupled to sets of n input and output ports by $^N/n$ passive optical networks the total number of wavelength multiplexers required is $$\frac{2N}{n} + \frac{2N}{m} + m \tag{2}$$

where m is the optimum number of tunable lasers per switch, and is a minimum when:

$$m=(2N)^{\frac{1}{2}} \tag{3}$$

which for N=8192 is 128 (which is greater than the probable broadband split size of about 32). The minimum possible number of multiplexers is therefore $$2N/n+2(2N)^{\frac{1}{2}} \tag{4}$$

Referring now to FIG. 3, a communications network according to the present invention is shown for interconnecting N customers divided into n sets. It comprises a central switching node 50 having $^N/n$ sets of input ports 52, a respective set of transmitters $T_{ij}$, associated with each set of input ports, the transmitters $T_{ij}$ being coupled to the input ports of the central node 50 by a respective passive optical sub-network 54 via a respective wavelength demultiplexer 55. Only one input sub-network is numbered for clarity. There are also $^N/n$ sets of output ports 56 each coupled to a respective set of optical receivers $R_{ij}$ by a passive optical network 58 via a wavelength multiplexer 59, again only one output sub-network being numbered for clarity.

The demultiplexer 55 distributes optical signals received from the subnetwork 54 to the input ports of the set 52 according to their wavelength, one wavelength being associated with each of the ports. The tunable lasers 60 of the transmitters $T_{ij}$ can each be tuned to the wavelength appropriate to the input port of the set 52 which it is to be coupled.

The transmitters $T_{ij}$ could each incorporate other tunable sources, for example a broadband optical source coupled to the sub-network 54 via a tunable optical filter.

Signals from the output ports of the set 56 each have associated with them a distinct wavelength determined by the fixed wavelength lasers 62. These optical signals are multiplexed onto the single optical fibre 58, and passively split to the receivers $R_{ij}$. Each receiver $R_{ij}$ comprises an optical receiver 64 and a tunable optical filter 66. Each of the receivers $R_{ij}$ selects the output to which it is to be coupled by tuning the optical filter 66 to its appropriate wavelength.

The central switching node, or exchange, 50 is a known second-stage optical space switching node having fixed wavelength lasers 68 and space switches 70.

It will be appreciated that devices other than tunable lasers and tunable filters may be employed to achieve the selection of the wavelengths to be transmitted and received by the transmitters $T_{ij}$ and the receivers $R_{ij}$.

The devolution of some of the switching power to the wavelength controllable optical transmitters $T_{ij}$ and receivers $R_{ij}$ allows simplification of the central switching node, whilst retaining the same interconnect power for the following reasons.

The number of crosspoints needed in the exchange 50 is reduced by removing the first-stage switches and the third-stage switches out into the passive networks, as wavelength switches. This allows the tunable lasers 60, the input demultiplexers 55, the output multiplexers 56 and the tunable optical filters 66 to be used simultaneously for both transmission, reception and switching tasks in the local loop. Only the middle stage of space switches are required at the exchange 50. With the passive networks providing nxn switches (n being the split size of the passive networks), then, if we assume that the n middle-stage switches are constructed as re-arrangeable switching networks, the minimum number of crosspoints required is $$n[(N/n)\log_2(N/n) - N/n + 1] = N\log_2(n/n) - N + n \quad (5).$$

Equations (1) and (5) are plotted in FIG. 4 for an n=32 way split. It can be seen that distributed switching provided by the present invention offers large reductions in the numbers of optical crosspoints required. For a network of 8192 customers, and a split size of 32, only 58% of the crosspoints in a centralised space switch would be needed. Greater savings could be made with larger passive split sizes, which could be achieved by the use of optical amplifiers.

Figure 5:
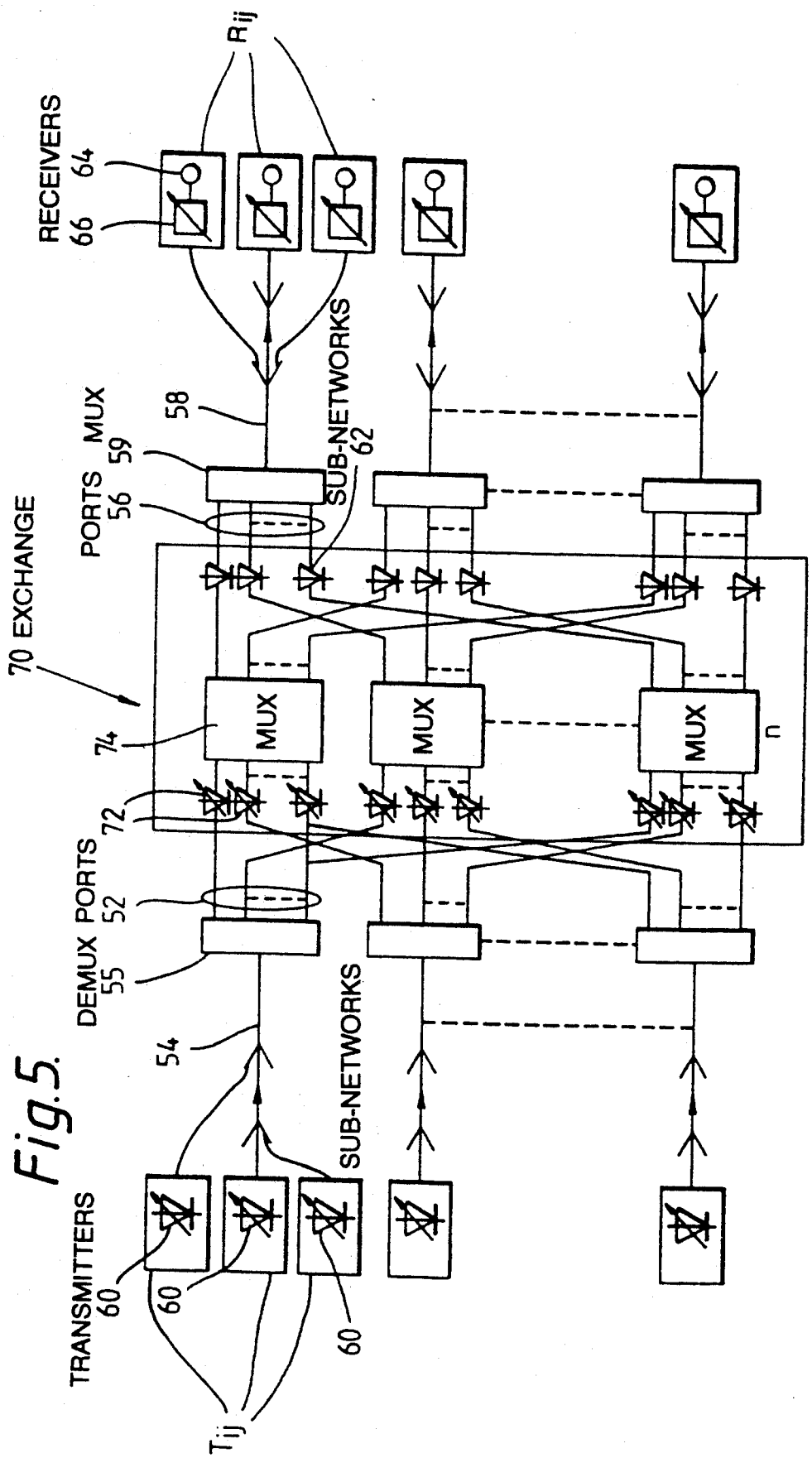
FIG. 5 is a schematic diagram of a communications network according to the present invention employing tunable transmitters and receivers and wavelength switching in the central node.

Referring now to FIG. 5, a distributed wavelength-/wavelength/wavelength embodiment of the present invention is shown.

The sub-networks are the same as those of the embodiment of FIG. 3, the same parts having the same reference numerals. The space switching node 50 of FIG. 3 is replaced by a wavelength switching node 70 including tunable lasers 72 coupled to the sets of input ports 52 and a wavelength multiplexer 74 for carrying out the switching in the wavelength domain in a known manner.

Removal of the first-stage and the third-stage wavelength switches cut into the passive networks reduces the laser and regenerator quantities to three per connection instead of five, and reduces the number of wavelength multiplexers to just three stages, with 2N/n in the passive limbs and a further n in the middle stage, i.e.

$$2N/n + n \quad (6)$$

wavelength multiplexers overall. Although there is an optimum split size n to minimise this quantity ($n_{opt}=128$ for N=8192), the realistic split size of 32 is used in FIG. 6 to compare equations (4) and (6). while the reductions in wavelength multiplexer quantities provided by distributed switching would of course be beneficial, their costs are shared between many customers (15 for N=8192, n=32), so these savings will probably not be as important as the 40% reduction from five lasers and regenerators per customer back to the minimum quantity of three, needed to achieve any form of broadband switching in the spatial or wavelength domains.

Referring to FIG. 7, a small network built to demonstrate the principle of the distributed wavelength switching of the present invention in a passive local network is shown. The wavelength/space/wavelength architecture of the type shown in FIG. 5 is chosen to demonstrate the combined use of both space and wavelength switches. The network has six passive optical "limbs", three upstream (80, 82 and 84) and three downstream (86, 88 and 90).

The optical limb 80 passively multiplexes optical signals at distinct wavelengths $\lambda_1$ and $\lambda_2$ from lasers 92 and 94 onto a 2.2 km single optical fibre 96. A 20-channel wavelength multiplexer 97 is used to simulate the coupling of many different wavelengths onto a single fibre. Twelve DFB lasers are multiplexed at 3.6 nm intervals in the 1500 mm window by the lasers (not shown). The multiplex is then coupled to each of the two input ports of the set 101 via respective optical filters 98 and 100 which demultiplex the received multiplex so one wavelength channel is received at each of the input ports. Each laser 92 and 94 can be coupled to either input port by tuning the optical filters 98 and 100 to the appropriate wavelengths.

Sub-networks 82 and 84 provide two inputs to pairs of inputs 102 and 104 by means of a 4-port optical coupler 106 and a 2×8 coupler 108 respectively, thereby passively multiplexing signals to optical filter demultiplexers as used in the sub-network 90.

The sub-network 86 has a passive optical fibre coupler 106 which multiplexes the optical signals from output ports 108 and 110, at two distinct wavelengths $\lambda_5$ and $\lambda_6$, onto a single 2.2 km long optical fibre 112. The output multiplex is coupled to receivers 114 and 116 via tunable optical filters 118 and 120 respectively, which allow each port 108 to be coupled to a selected receiver or receivers 114 and 116.

The sub-networks 90 has a 1×7 monolithic coupler 122 to simulate a 7-way branching passive network, in the sub-network 88 provides a sub-network without a single optical fibre portion by means of a 4-port passive optical coupler 124. The channel selection in the sub-networks 88 and 90 is by the same means as described above in relation to the sub-network 86. Because fixed-wavelength DFB sources are used, rather than tunable lasers, the routing tasks of the wavelength demultiplexers in the first stage of switching of FIG. 3 are obtained by means of fused-fibre couplers, followed by additional tunable optical filters to select the correct wavelength channels. The tunable optical filters each employ a compact disc focussing coil to move an optical fibre in a dispersive imaging system, thus selecting any wavelength across the range 1250–1600 nm, with a half-power bandwidth of 2.6 nm.

There are just two middle-stage space switches 124 and 126, each of size 3×3, so that a 6×6 network can be demonstrated overall. Each 3×3 switch 124 and 126 is constructed as a re-arrangeable switching network (RSN), using three commercially available, single-mode 2×2 changeover switches (not shown).

Figure 8:
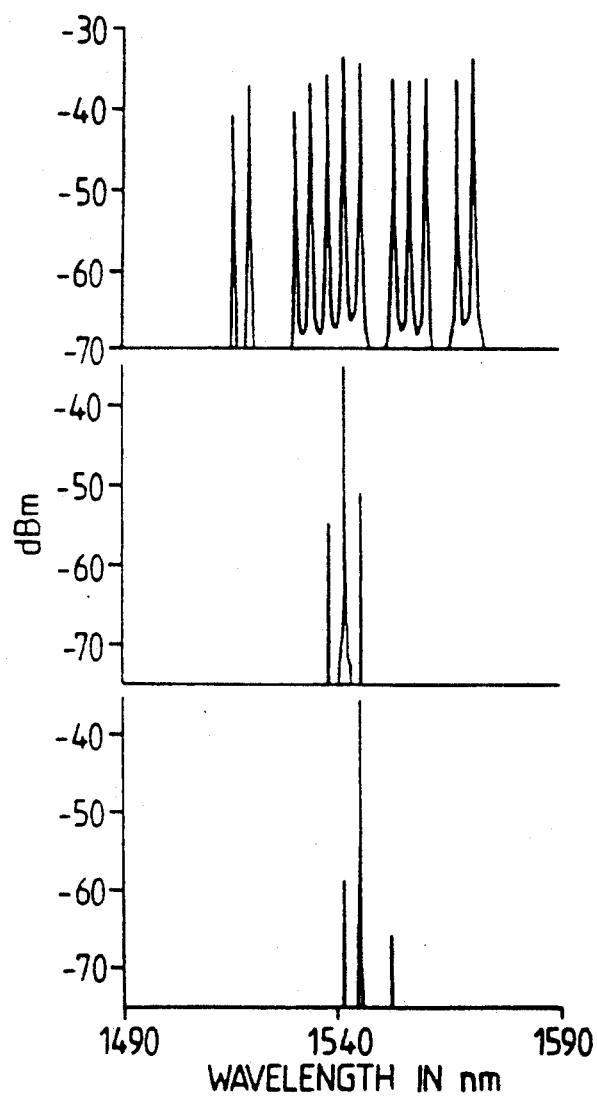
FIG. 8 is a graph showing the selection of two adjacent channels from twelve by the embodiment of FIG. 6.

FIG. 8 shows two adjacent DFB laser wavelengths being selected by a filter from the twelve multiplexed channels. The coupling tasks of the wavelength multiplexers in the third stage of switching in FIG. 3 are also undertaken with fused-fibre couplers. In this small demonstration network, there is no need for a third set of regenerators and lasers upstream of the space switches.

Several key features of the distributed architecture are of particular importance. Firstly, the concept of re-use of the same set of wavelengths in the different passive limbs. To demonstrate this, the lasers in the sub-network 80 have essentially the same wavelengths $\lambda_1$ and $\lambda_2$ as those in the sub-network 84. Having identical sets of wavelengths in each first-stage switch like this requires a second feature, namely that wavelength conversion must take place before signals enter the third-stage switch (passive network) lest two identical wavelengths couple together there. Although direct wavelength translation devices might one day perform this task, it is achieved here by simple regeneration to an electrical signal, followed by re-emission from a new laser. Two signals at identical wavelengths, one from the sub-network 80 and one from the sub-network 84, can be switched through separate middle-stage space switches to outputs on the same third-stage sub-network 86, 88 or 90.

An important feature of the architecture of the present invention is its capability of broadcasting. The power-splitting nature of the third stage makes the passive optical network ideally suited for broadcast (one-to-many) connections. By simply allowing more than one optical filter to tune to the same wavelength simultaneously, all the customers on a sub-network can receive the same signal. Furthermore, in principle, any transmitter could become a service provider to any number of receivers, by using the same power splitting mechanism in the first-stage switches to produce multiple copies onto the middle-stage switches in the manner of the re-arrangeable broadcast networks. In such networks the middle-stage switches would also need to possess a broadcasting function, which can easily be fulfilled by the wavelength/wavelength/wavelength distributed architecture, and which needs only slight modification of the space switches in the wavelength/space/wavelength architecture.

In summary, the present invention provides a distributed wavelength switching architecture for passive optical networks. Rather than performing all the broadband switching conventionally in a central exchange, the architecture distributes the first and last stages of switching over the passive optical network, sharing the same components already required for transmission purposes. Only the middle stage of switching requires additional components in the exchange. In this way, large savings in component quantities are provided compared with the conventional local network architecture of centralised switching. The principle of distributed switching can be extended to provide a full broadcasting capability from any customer to all others.

Although the benefits of the proposed architecture of the present invention has been discussed for re-arrangeably non-blocking switch structures, the invention is also applicable with strictly non-blocking switches.

The present invention is also applicable to bi-directional networks, in which case the optical outputs from a set of output ports may be multiplexed to propagate along a transmitter sub-network, in which case the one passive sub-network is to be considered for the purposes of the patent application to be form simultaneously a transmitter sub-network and a receiver sub-network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A communications network comprising:
   a central switching node having at least two sets of input ports and at least two sets of output ports.
   each set of input ports being coupled to a respective set of optical transmitters by a respective input optical switching sub-network, and set of output ports being coupled to a respective set of optical receivers by a respective output optical switching sub-network;
   wherein each input switching sub-network selectively couples its respective set of said input ports to its respective set of optical transmitters by a switching function which is capable of coupling each of said transmitters to at least any selected one of said input ports; and
   wherein each said output switching sub-network selectively couples its respective set of said output ports to its respective set of optical receivers by a switching function which is capable of coupling each of said output ports to at least any selected one of said receivers.

2. A network as in claim 1, in which:
   at least one of the input optical sub-networks includes an input optical fibre sub-network for passively multiplexing signals from its respective sub-set of optical transmitters into an input multiplex of transmitter channels, and
   said at least one input optical sub-network further comprises an input demultiplexing means for coupling each channel of the respective multiplex to a respective input.

3. A network as in claim 2, in which each transmitter of each said at least one input optical sub-network includes means controllable to transmit signals on a channel corresponding to the input port to which it is to be selectively coupled.

4. A network as in claim 2, in which the input demultiplexing means of each said at least one input optical sub-network is controllable to couple the signals on each channel to a selected input port.

5. A network as in claim 4, in which:
   each transmitter of each said at least one input optical sub-network includes means for transmitting signals of a distinct wavelength, each wavelength corresponding to a channel, and
   the input demultiplexing means comprises one or more passive optical splitters for coupling the received input multiplex to each input port via a tunable optical filter.

6. A network as in clam 1, in which:
   at least one of the output optical sub-networks includes an output optical fibre sub-network, and
   said at least one output optical sub-network further comprises an output multiplexing means for passively multiplexing signals from its respective subset of outputs into an output multiplex of receiver channels, the associated output optical fibre sub-network coupling the output multiplex to the respective receivers, and each receiver being arranged to receive signals from one channel.

7. A network as in clam 5, in which each receiver of each said at least one output optical sub-network includes means controllable to receive signals on a channel corresponding to the output port to which it is to be selectively coupled.

8. A network as in claim 7, in which each receiver of each said at least one output optical sub-network includes a tunable optical filter.

9. A network as in claim 6, in which the output multiplexing means of each said at least one output optical sub-network includes means controllable to form an output multiplex of signals on the associated channels such that each output port is coupled to a selected receiver.

10. A network as in claim 9, in which each receiver of each said at least one output optical sub-network includes means for receiving signals on a respective distinct wavelength and the associated output multiplexing means includes wavelength tunable optical sources.

11. A network as in claim 2, in which:
at least one of the output optical sub-networks includes an output optical fibre sub-network,
said at least one output optical sub-network further comprises an output multiplexing means for passively multiplexing signals from its respective subset of outputs into an output multiplex of receiver channels, the associated output optical fibre sub-network coupling the output multiplex to the respective receivers, and each receiver being arranged to receive signals from one channel, and
the input multiplex of each said at least one input optical sub-network and the output multiplex of each said at least one output optical sub-network are each formed onto a respective single optical fibre.

12. A network as in claim 11, in which the signals from the transmitters of each said at least one input optical sub-network and the signals from the outputs of each said at least one output optical sub-network are formed into respective wavelength multiplexes.

13. A network as in claim 12, in which said transmitters include wavelength tunable optical sources.

14. A communications network as claimed in claim 1, in which the central switching node comprises:
a plurality of switches, there being the same number of switches as there are ports in each set of input ports and as there are ports in each set of output ports.
each switch having a plurality of inputs and a plurality of outputs,
the inputs of each switch being coupled to input ports of the sets of input ports in such a manner that a given input of a given switch is coupled to a given input port of a given set of input ports, and in such a manner that the inputs of a given switch are coupled to input ports of different sets of input ports,
the outputs of each switch being coupled to output ports of the sets of output ports in such a manner that a given output of a given switch is coupled to a given output port of a given set of output ports, and in such a manner that the outputs of a given switch are coupled to output ports of different sets of output ports, and
each switch being operable to connect any one of its inputs to at least any one of its outputs.

* * * * *